US009257031B2

(12) United States Patent
Stinis

(10) Patent No.: US 9,257,031 B2
(45) Date of Patent: Feb. 9, 2016

(54) METHOD AND DEVICE FOR DETECTING CRACK FORMATION IN A HOISTING MEMBER

(75) Inventor: Cornelis Stinis, Krimpen Aan de Lek (NL)

(73) Assignee: STINIS BEHEER B.V., Krimpen Aan de Lek (NL)

( * ) Notice: Subject to any disclaimer, the term of this patent is extended or adjusted under 35 U.S.C. 154(b) by 151 days.

(21) Appl. No.: 13/822,513

(22) PCT Filed: Oct. 17, 2011

(86) PCT No.: PCT/NL2011/050709
§ 371 (c)(1),
(2), (4) Date: May 28, 2013

(87) PCT Pub. No.: WO2012/050452
PCT Pub. Date: Apr. 19, 2012

(65) Prior Publication Data
US 2013/0241736 A1    Sep. 19, 2013

(30) Foreign Application Priority Data

Oct. 16, 2010  (NL) ...................................... 1038312

(51) Int. Cl.
| G08B 21/18 | (2006.01) |
| G01L 1/24 | (2006.01) |
| G01L 5/10 | (2006.01) |
| G01M 5/00 | (2006.01) |
| G01M 11/08 | (2006.01) |

(52) U.S. Cl.
CPC .............. *G08B 21/182* (2013.01); *G01L 1/246* (2013.01); *G01L 5/101* (2013.01); *G01L 5/105* (2013.01); *G01M 5/0041* (2013.01); *G01M 11/086* (2013.01)

(58) Field of Classification Search
CPC ......... B66C 13/16; B66C 1/663; B60P 7/132; G01D 5/353; G01D 5/26; G01L 1/246; G01L 5/105; G01M 5/0041; G01M 11/086; G01M 11/083; G08B 21/182
See application file for complete search history.

(56) References Cited

U.S. PATENT DOCUMENTS

| 5,748,312 A * | 5/1998 | Kersey et al. .................. 356/478 |
| 7,571,058 B2 * | 8/2009 | Sealing et al. .................. 702/34 |
| 8,276,461 B2 * | 10/2012 | Zwygart .......................... 73/800 |

FOREIGN PATENT DOCUMENTS

| GB | 2460044 A | 11/2009 |
| WO | 96/18866 A1 | 6/1996 |
| WO | 02/052242 A2 | 7/2002 |
| WO | WO 02092492 A1 * | 11/2002 |

OTHER PUBLICATIONS

International Search Report and Written Opinion dated Apr. 11, 2012, issued from corresponding PCT/NL2011/050709.

* cited by examiner

*Primary Examiner* — Brian Zimmerman
*Assistant Examiner* — Sara Samson
(74) *Attorney, Agent, or Firm* — Banner & Witcoff, Ltd.

(57) ABSTRACT

The invention relates to a method for detecting crack formation in a hoisting member, comprising the steps of measuring a stress under load at two points of the hoisting member, comparing the measured stresses and generating a warning signal when the measured stresses differ too much from each other.

Figure 1:
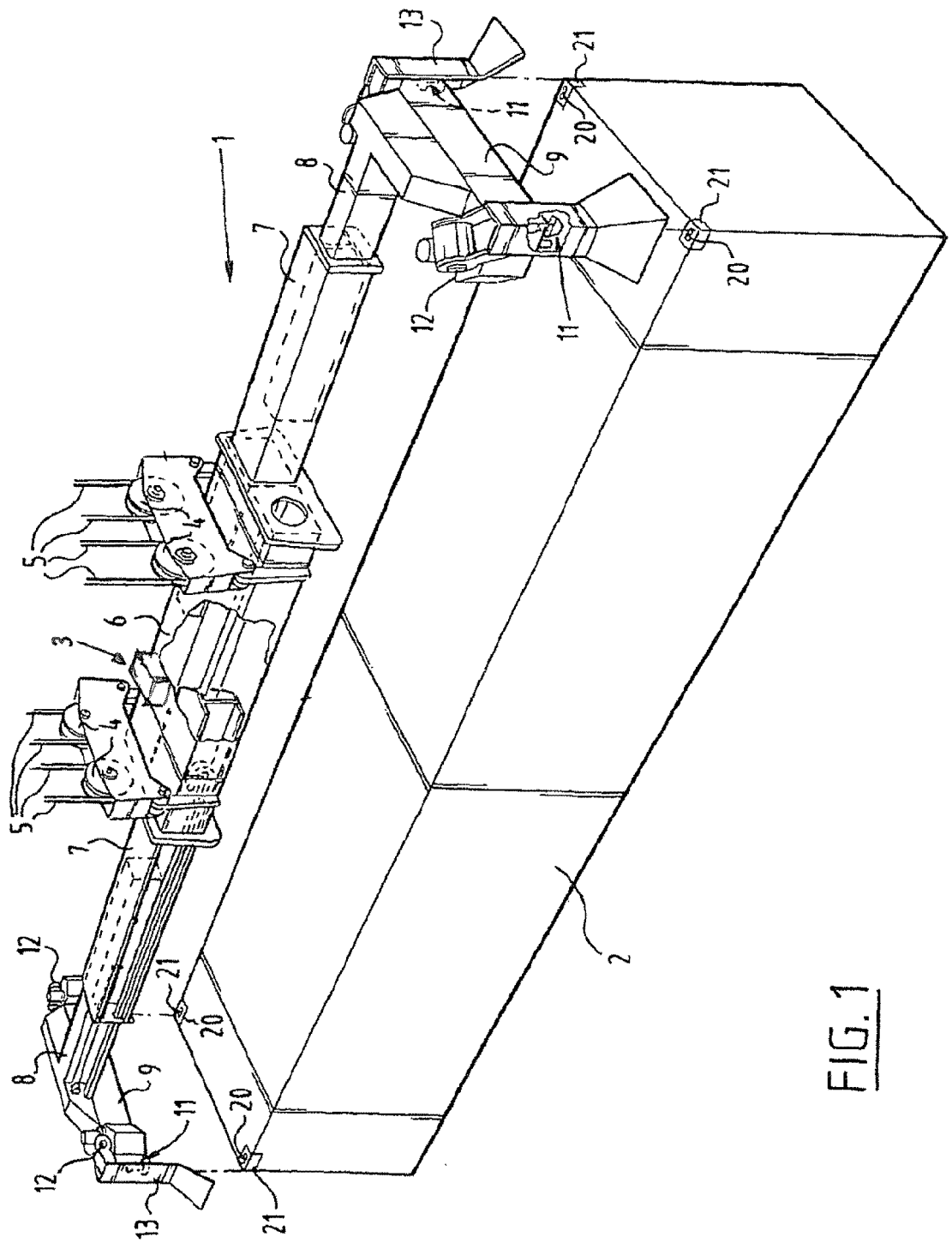

The invention also relates to a device for detecting crack formation in a hoisting member, comprising means arranged at two points of the hoisting member for measuring a stress under load, means connected to the measuring means for comparing the measured stresses, and means connected to the comparing means for generating a warning signal when the measured stresses differ too much from each other.

Finally, the invention relates to a hoisting frame, comprising a number of hoisting members which are mounted thereon close to its corners, and crack detection devices connected thereto.

19 Claims, 4 Drawing Sheets

METHOD AND DEVICE FOR DETECTING CRACK FORMATION IN A HOISTING MEMBER

RELATED APPLICATION DATA

This application is a National Stage Application under 35 U.S.C. 371 of co-pending PCT Application PCT/NL2011/050709, designating the United States and filed Oct. 17, 2011, titled "Method and Device for Detecting Crack Formation in a Hoisting Member", which claims the priority benefit of NL Patent Application No. 1038312, filed Oct. 16, 2010, titled "Method and Device for Detecting Crack Formation in a Hoisting Member", the entire disclosure of each of which is hereby incorporated by reference for all purposes.

The invention relates to a method for detecting crack formation in a hoisting member such as for instance a twist-lock. Such twist-locks are used on a large scale for attaching containers.

A container is usually provided at its eight corner points with so-called corner castings, in which are formed openings which are adapted to the form of the head of a twist-lock. When a container must for instance be transferred from a ship to a quay or vice versa by means of a crane, a hoisting frame, a so-called spreader, suspended via hoisting cables from the crane is lowered to a position immediately above the container. The spreader is provided at its four corners with twist-locks which are then placed in the corner castings by careful manoeuvring with the spreader, after which they are rotated a quarter-turn in order to lock the head of each twist-lock in the corner casting. The spreader with the container thereon is then hoisted up by hauling in the hoisting cables.

Speed is of great importance in the transfer of containers because container ships are too expensive to remain in port for a long time. Due to the high speeds at which spreaders are lowered and hoisted, high and greatly varying loads occur which entail the risk of cracks developing in the twist-locks. A twist-lock may eventually fail due to crack formation, whereby the remaining twist locks are loaded more heavily, which may itself also result in crack formation and failure. Because failure of one or more twist-locks may result in a container falling off the spreader, which can have catastrophic consequences, twist-locks are replaced frequently in practice before the risk of crack formation becomes too great. Because a safe margin is often set here, twist-locks are generally replaced too soon and too often, whereby the spreader is out of operation unnecessarily frequently.

The invention now has for its object to provide a method with which crack formation in a hoisting member such as a twist-lock can be detected in reliable manner and in good time, i.e. well before the crack will form a danger. According to the method this is achieved with a method comprising the steps of:

measuring a stress under load at least at two points of the hoisting member, comparing the measured stresses, and generating a warning signal when the measured stresses differ too much from each other.

By measuring the stresses at two or more points in the hoisting member and comparing them to each other a picture of the state of the hoisting member is obtained in rapid, simple and reliable manner. When too great a variation is determined between the measured stresses, this is an indication that the effective, bearing surface of the hoisting member at one of the measuring points has become smaller than is to be expected on the basis of the known geometry, this indicating the occurrence of a crack.

The stress at each point is preferably measured by measuring a corresponding deformation at that point. Deformations are after all easier to measure than stresses.

When a first deformation is measured at a relatively lightly loaded point of the hoisting member and a second deformation is measured at a relatively heavily loaded point of the hoisting member, the first deformation can be used as reference. Possible crack formation will after all occur first in more heavily loaded parts of the hoisting member. In the case of a hoisting member of the twist-lock type the first deformation can advantageously be measured in a shaft of the hoisting member, while the second deformation can then be measured close to an outer end of the hoisting member attached to a hoisting frame.

Depending on the manner in which the hoisting member is mounted on the hoisting frame, the second deformation can be measured at a screw thread—preferably the first thread, which will be the most heavily loaded—or at a collar. In the case of a hoisting member with double collar as described in applicant's older patent EP 1 385 772 B1, a deformation can be measured at each collar, so in addition to the second deformation also a third one. This third deformation is then also compared here to the first deformation.

Although it is possible to envisage different ways to measure deformations, it is recommended that the deformations are measured optically. An optical measurement can be performed quickly and accurately and requires only slight modifications to the hoisting member.

The invention also relates to a device with which the above described method can be performed. According to the invention such a crack detection device comprises means arranged at least at two points of the hoisting member for measuring a stress under load, means connected to the measuring means for comparing the measured stresses, and means connected to the comparing means for generating a warning signal when the measured stresses differ too much from each other. The warning signal-generating means can be connected to a control system of a hoisting frame, or even of a crane, so that a hoisting operation can be immediately interrupted as soon as a crack is detected in a hoisting member.

Preferred embodiments of the crack detection device according to the invention are described in the dependent claims 10-16.

A simple, robust and compact device is obtained when the measuring means comprise an optical fibre which is connected to the hoisting member and the deformation of which can be measured optically.

The different measuring means preferably comprise a shared optical fibre extending along the relevant measuring points. The modifications necessary to the hoisting member are thus limited even further.

In order to obtain a reliable picture of the deformation of the optical fibre, and thereby of the hoisting member, it is advantageous for the optical fibre to have in the vicinity of the measuring points processed parts which generate a specific light reflection. Determined points in the optical fibre can be identified by these specific light reflections, for instance caused by a Bragg grating.

A robust crack detection device is obtained when the optical fibre is received in a bore in the hoisting member. The hoisting member thus in fact forms the protection for the device. It is recommended here that the bore is formed in the vicinity of a central axis of the hoisting member so that the deformations remain limited to elongation or shrinkage, and torsion and bending have no effect thereon.

The means for generating the warning signal can be arranged on a hoisting frame on which the hoisting member is mounted. These generating means can thus be operatively connected to the comparing means for a number of different hoisting members. The generating means can thus also be connected centrally to a control system of the hoisting frame or of the crane.

Finally, the invention also relates to a hoisting frame in which the above described crack detection is implemented. Such a hoisting frame comprises a number of hoisting members which are mounted on the hoisting frame close to its corners, and crack detection devices of the above described type which are connected to the hoisting members.

Figure 2:
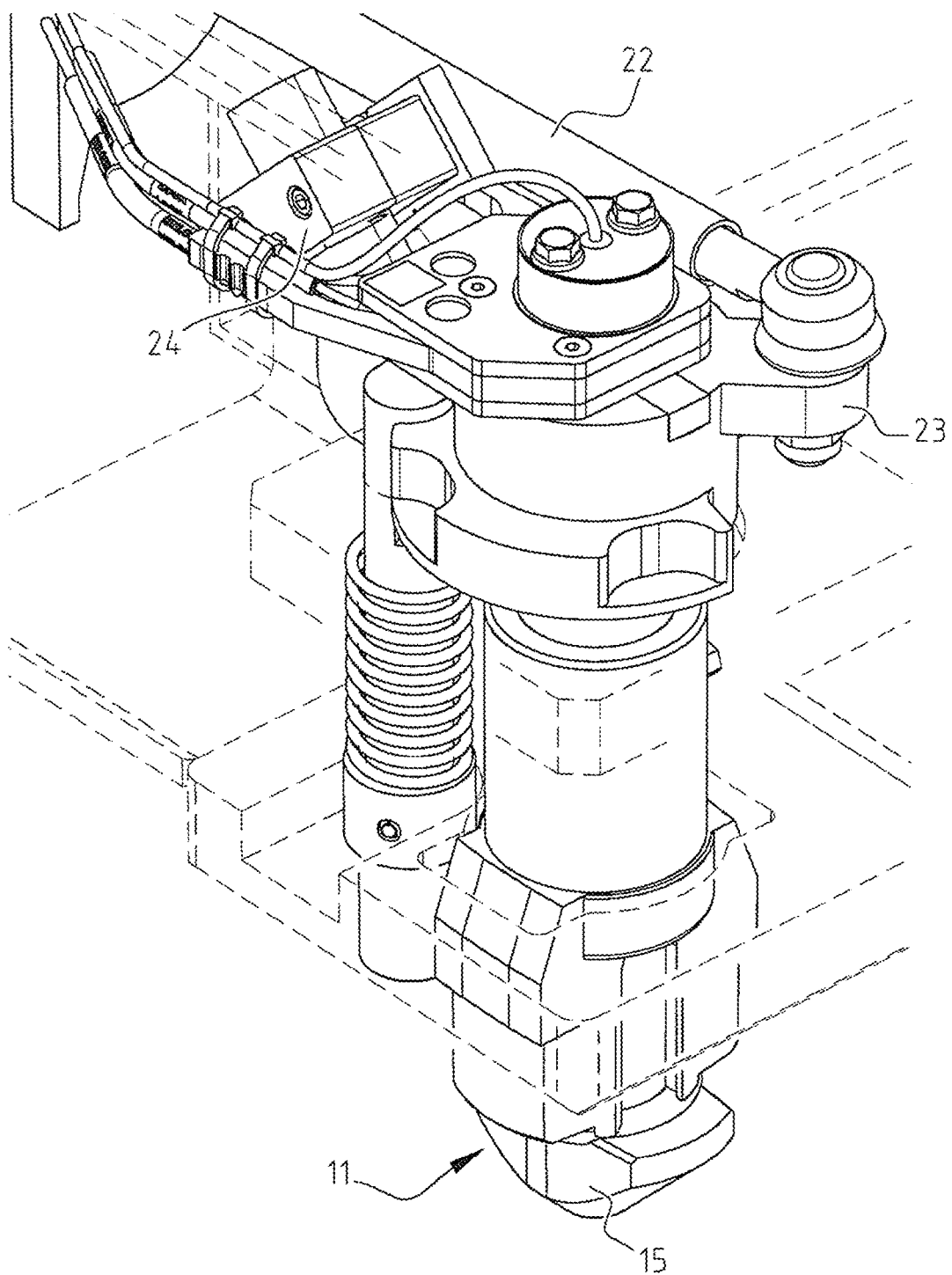
Figure 3:
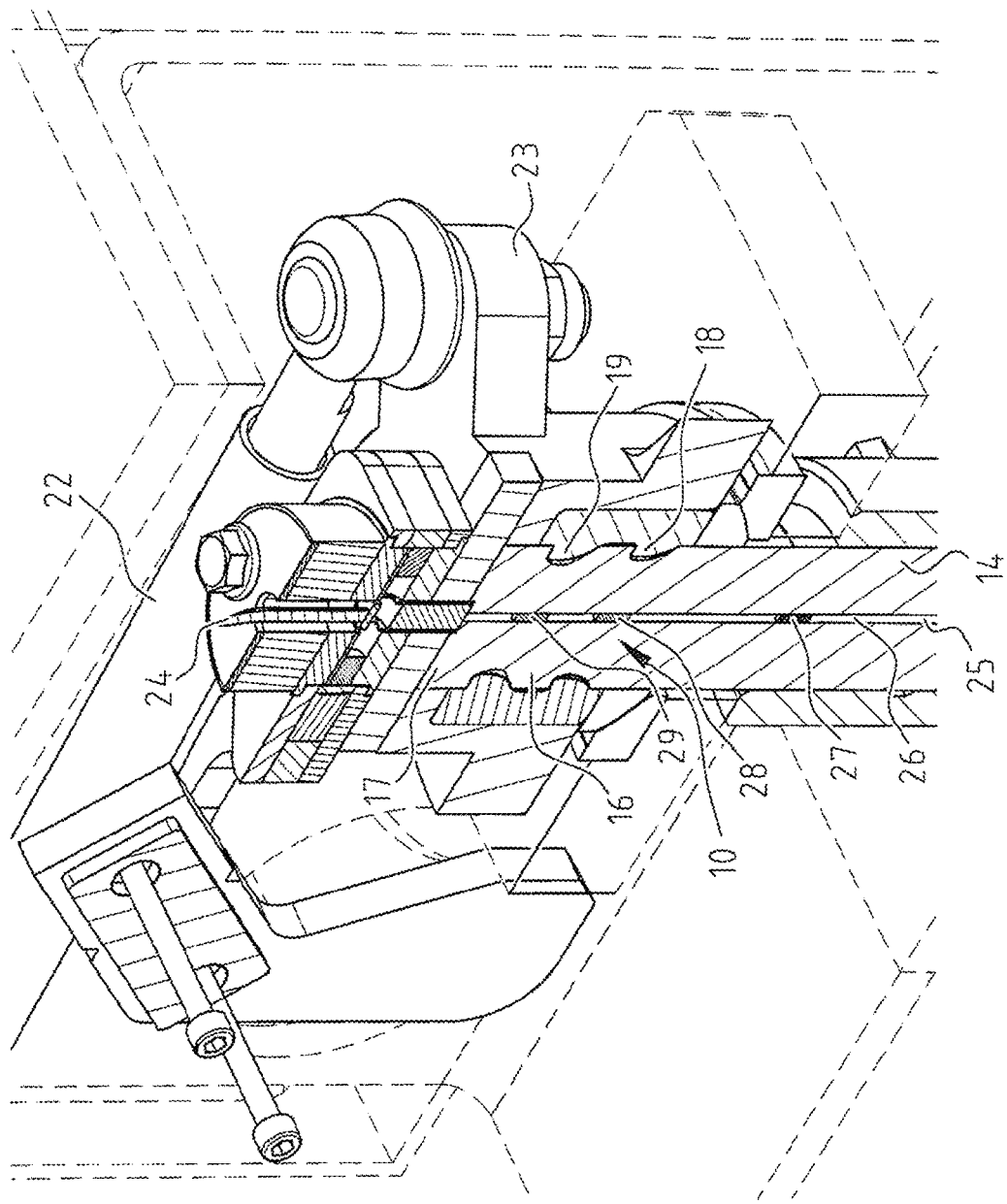
Figure 6:
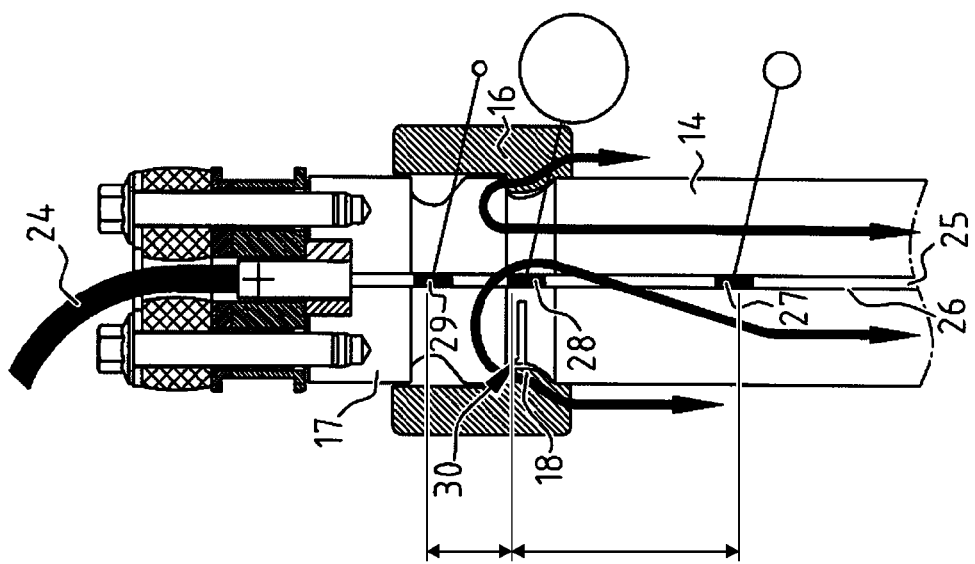
Figure 5:
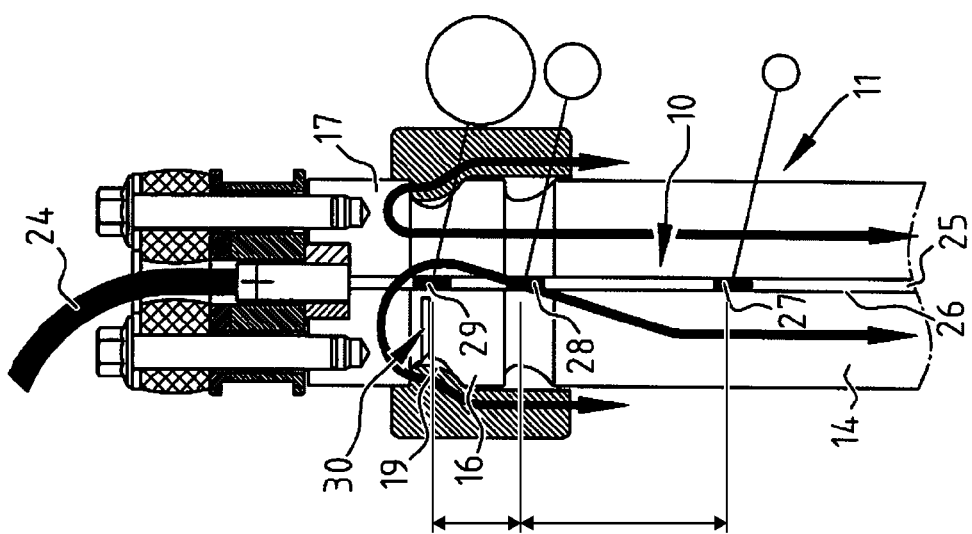
Figure 4:
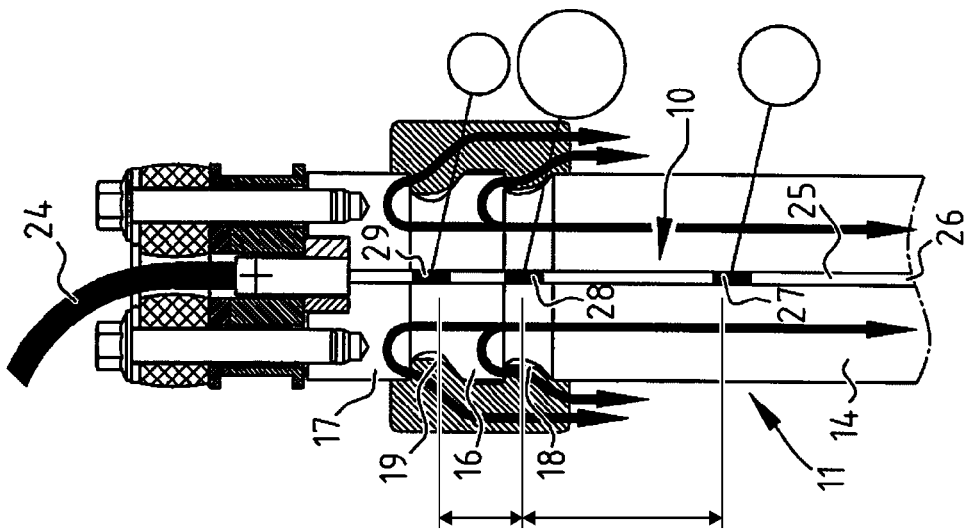

The invention will now be elucidated on the basis of an embodiment, wherein reference is made to the accompanying drawing, in which:

FIG. 1 is a perspective view of a hoisting frame (spreader) from which a container is suspended using hoisting members (twist-locks) which engage in corner castings FIG. 2 is a perspective view of a hoisting member with double collar and a crack detection device according to the invention, FIG. 3 shows on enlarged scale and in detail a cross-section through the perspective of FIG. 2, FIG. 4 shows a cross-section through the upper part of a hoisting member with double collar and crack detection according to FIGS. 2 and 3 in a normal, undamaged starting situation, FIG. 5 is a view corresponding to FIG. 4 of the double-collar hoisting member with a crack in the upper collar, when it is suspended in a support element with single collar, and FIG. 6 is a view corresponding to FIG. 5 of the situation in the case of a crack close to the lower collar.

A hoisting frame or spreader 1 for transporting containers 2 is suspended from a container crane (not shown here) by means of cables 5 trained round pulleys 4. Hoisting frame 1 comprises a central beam 6, two extendable intermediate beams 7 and two extendable outer beams 8. Each outer beam 8 supports a transverse beam 9 which defines two corner points 12. Arranged at these corner points 12 of hoisting frame 1 are hoisting members or twist-locks 11 which engage in openings 20 in corner castings 21 of container 2. Pivotable guide members or flippers 13 are also arranged at corners 12.

Each hoisting member 11 is substantially T-shaped and has a shaft 14 and a hammerhead 15. Two grooves, and thereby also two collars or shoulders 16, 17, are formed on the upper side of shaft 14, whereby hoisting member 11 is suspended in an annular support element which likewise has two grooves and two collars 18, 19. These two collars form a redundant path of force as described in EP 1 385 772 B1. The rotating movement for locking and unlocking hoisting member 11 is provided by a control rod 22 which engages on an arm 23, which is in turn mounted on hoisting member 11.

The state of hoisting member 11 is monitored by a crack detection device 10. In the shown embodiment possible cracking is detected by measuring at different locations in hoisting member 11 the deformations which occur when hoisting member 11 is loaded by the weight of a container 2 suspended therefrom. By comparing the measured deformation to the deformation of a part of hoisting member 11 where no cracking will normally occur, here shaft 14, an excessive deformation can be detected in good time. Such an excessive deformation is an indication that the effective bearing surface of the hoisting member has greatly decreased locally, this in turn being an indication that a crack has developed.

In the shown embodiment the crack detection device 10 is of an optical nature and comprises an optical fibre 25 which is received in a bore 26 in shaft 14 of hoisting member 11. This bore 26 is so narrow that the strength of hoisting member 11 is substantially unaffected. Bore 26 is further formed in the central axis of hoisting member 11 and so coincides with the neutral line, so that only elongation resulting from the tensile load of the container is detected. Torsion and bending have no effect on this line.

Optical fibre 25 is attached to the wall of bore 26 at multiple points or even along its whole length, so that fibre 25 must follow the elongation of hoisting member 11 under load. This elongation can be optically detected and measured in that optical fibre 25 is processed at important points such that it generates a very specific reflection pattern when light radiates through optical fibre 25. Such a processing is for instance the formation of a so-called Bragg grating. These points, and thereby also their mutual distance, can thus be identified in the reflection. A change in the mutual distance of these specific points forms a measure for the deformation of hoisting member 11.

In the shown embodiment the optical fibre is processed at three points 27, 28, 29. First point 27 is situated in shaft 14, which has a constant diameter and where no stress concentrations therefore occur. The load, and thereby the chance of crack formation, is relatively small here, and this point therefore applies as reference. Second point 28 is situated at the position of lower collar 16, which is in fact intended as safety in the case upper collar 17 were to fail, but which in practice sometimes already bears part of the regular load. Third measuring point 29 is situated at the position of upper collar 17, which must in principle transmit the load to the hoisting frame.

The distance between the first, second and third measuring points 27, 28, 29 under load can be measured and compared to measured values in the unloaded state. Such a comparison gives a good impression of the degree of deformation of the different parts of hoisting member 11. Two measuring points can also be present at each relevant location so that the elongation can be determined at each measuring point and be compared to the elongation at other measuring points. This comparison also shows at a glance where there are high stresses which may indicate the presence of a crack.

The comparison is made at a central location, where a warning signal is also generated when an excessive deformation is ascertained. In the shown embodiment each optical fibre 25 is connected via an optical cabling 24 to a central unit 3 on the hoisting frame which processes, compares and assesses the signals from the different detection devices. This central unit 3 is in turn connected to the crane control system so that a hoisting operation can be immediately stopped when a crack is detected.

FIG. 4 shows the normal loaded starting state of a non-cracked hoisting member 11. The size of the ball connected to each measuring point represents a measure of the deformation, and therefore the stress, occurring there. The progress of the loads through the hoisting member and the surrounding construction is shown with arrows. It can be seen how lower collar 16 of hoisting member 11 and lower collar 18 of the support element take up the lion's share of the load. The deformation at the position of measuring point 28 is thus greater than that at the other two measuring points 27, 29. This situation applies as reference for later measurements.

In this embodiment the deformation is detected due to the elongation of the associated parts of optical fibre 25, whereby the processed zones 27, 28, 29 with their specific reflection patterns also elongate and change the reflection patterns.

When a crack 30 develops at the position of upper collar 17 the effective bearing surface of hoisting member 11 decreases there so that the local stress increases, and thereby also the deformation. FIG. 5 shows how the lines of force run around crack 30 and the deformation is very great at the upper measuring point 29. The stress and deformation at the middle and lower measuring points 28, 27 are on the other hand much smaller than normal. Comparison of the deformations measured at the position of points 27, 28, 29 to each other and to the reference situation of FIG. 4 shows that a crack must be present at the upper measuring point 29. This detection results in a warning signal being generated, whereby hoisting is stopped so that hoisting member 11 can be replaced.

Something similar takes place when cracking occurs close to lower collar 16. This collar 16 is intended as last resort in the case upper collar 17 fails, so that crack formation in lower collar 16 can in principle be catastrophic. The crane is then also stopped immediately as a result of a warning signal ensuing from comparison of the measurement results at points 27, 28 and 29.

The described method of detection is of course not limited to hoisting members with double collar. It can also be applied in hoisting members with single collar, albeit that it is then usually possible to suffice with two instead of three measuring points. When a hoisting member is provided with screw thread, the deformation can also be measured in the manner described here. The most relevant measuring point is then often the first thread of the screw thread, where the loads are highest and the chance of cracking thus also greatest.

Although the invention is described above on the basis of an embodiment, it will be apparent that it is not limited thereto but can be varied in many ways. Instead of a single optical fibre with different processed zones, a number of optical fibres could thus be applied adjacently of each other. These could then each co-act with a laser distance meter. Other measurements of the deformation, for instance on the basis of electrical phenomena, could also be applied. The application is further not limited to twist-locks, but crack formation in other hoisting members, for instance simple hooks, could also be detected in this manner. The scope of the invention is therefore defined solely by the following claims.

The invention claimed is:

1. A method for detecting crack formation in a hoisting member, comprising the steps of:
    measuring a stress under load at least at two points of the hoisting member,
    comparing the measured stresses, and
    generating a warning signal when the measured stresses differ too much from each other,
    wherein the stress at each point is measured by measuring a corresponding deformation between that point and another point, and
    wherein a first deformation is measured between a relatively lightly loaded point of the hoisting member and another point, and a second deformation is measured between a relatively heavily loaded point of the hoisting member and another point.

2. The method for detecting crack formation in a hoisting member as claimed in claim 1, wherein the first deformation is measured in a shaft of the hoisting member and the second deformation is measured close to an outer end of the hoisting member attached to a hoisting frame.

3. The method for detecting crack formation in a hoisting member as claimed in claim 2, wherein the hoisting member is mounted on the hoisting frame by means of a screw connection and the second deformation is measured close to a relatively heavily loaded screw thread.

4. The method for detecting crack formation in a hoisting member as claimed in claim 2, wherein the hoisting member is mounted on the hoisting frame by means of a collar and the second deformation is measured close to the collar.

5. The method for detecting crack formation in a hoisting member as claimed in claim 2, wherein the hoisting member is mounted on the hoisting frame by means of a double collar, the second deformation is measured close to one of the collars and a third deformation is measured close to the other collar, which third deformation is likewise compared to the first deformation.

6. The method for detecting crack formation in a hoisting member as claimed in claim 1, wherein the deformations are measured optically.

7. A crack detection device for detecting crack formation in a hoisting member, comprising:
    at least two measurement elements, each of which is arranged at a point of the hoisting member for allowing measurement of a stress under load,
    a comparator connected to the measuring elements for comparing the measured stresses, and
    a warning signal generator connected to the comparator for generating a warning signal when the measured stresses differ too much from each other,
    wherein each of the measurement elements is adapted to allow measurement of a deformation between the point at which the measurement element is arranged and another point, said deformation corresponding to the stress, and
    wherein the measurement elements comprises a first measurement element arranged at a relatively lightly loaded point of the hoisting member and a second measurement element arranged at a relatively heavily loaded point of the hoisting member.

8. The crack detection device as claimed in claim 7, wherein the first measurement element is arranged in a shaft of the hoisting member and the second measurement element is arranged close to an outer end of the hoisting member attached to a hoisting frame.

9. The crack detection device as claimed in claim 7, wherein the hoisting member is mounted on a hoisting frame by means of a screw connection and the second measurement element is arranged close to a relatively heavily loaded screw thread.

10. The crack detection device as claimed in claim 7, wherein the hoisting member is mounted on a hoisting frame by means of a collar and the second measurement element is arranged close to the collar.

11. The crack detection device as claimed in claim 7, wherein the hoisting member is mounted on a hoisting frame by means of a double collar, the second measurement element is arranged close to one of the collars and a third measurement element is arranged close to the other collar, wherein the comparator is adapted to compare a measurement of the third measurement element to a measurement of the first measurement element.

12. The crack detection device as claimed in claim 7, wherein the measurement elements comprise optical measuring members.

13. The crack detection device as claimed in claim 12, wherein the measurement elements are arranged in an optical fibre which is connected to the hoisting member and the deformation of which can be measured optically.

14. The crack detection device as claimed in claim 13 wherein the different measuring means are arranged in a shared optical fibre extending along the relevant measuring points.

15. The crack detection device as claimed in claim 13 wherein the measurement elements comprise processed parts of the optical fibre which generate a specific light reflection.

16. The crack detection device as claimed in claim 13, wherein the optical fibre is received in a bore in the hoisting member.

17. The crack detection device as claimed in claim 16, wherein the bore is formed in the vicinity of a central axis of the hoisting member.

18. The crack detection device as claimed in claim 7, wherein the warning signal generator is arranged on a hoisting frame on which the hoisting member is mounted.

19. A hoisting frame assembly, comprising:

a hoisting frame having corners, a plurality of hoisting members which are mounted on the hoisting frame close to the corners of the hoisting frame, and crack detection devices connected to the hoisting members for detecting crack formation in the hoisting members, each crack detection device comprising:

at least two measurement elements, each of which is arranged at a point of one of the hoisting members for measuring a stress under load at the point at which it is arranged, a comparator connected to the measurement elements for comparing the measured stresses, and a warning signal generator connected to the comparator for generating a warning signal when the measured stresses differ too much from each other, wherein each of the measurement elements is adapted to allow measurement of a deformation between the point at which the measurement element is arranged and another point, said deformation corresponding to the stress, and wherein the measurement elements comprises a first measurement element arranged at a relatively lightly loaded point of the hoisting member and a second measurement element arranged at a relatively heavily loaded point of the hoisting member.

* * * * *